Nov. 21, 1950 — M. C. CISLER — 2,531,110

WIRING DUCT

Filed April 3, 1947

Inventor:
Marvin C. Cisler,
by Merton D. Moss
His Attorney.

Patented Nov. 21, 1950

2,531,110

UNITED STATES PATENT OFFICE 2,531,110

WIRING DUCT

Marvin C. Cisler, Fayetteville, N. Y., assignor to General Electric Company, a corporation of New York Application April 3, 1947, Serial No. 739,231

2 Claims. (Cl. 174—52)

My invention relates to improvements in cabinets for electrical apparatus. More particularly it relates to wiring ducts intended for use in such cabinets.

The present practice in wiring electrical apparatus housed in cabinets, having a multiplicity of units, is to cable the conductors by lacing them together and cleating to the walls or side of the cabinet. This is not only unsightly, but is also expensive and makes it difficult to replace or add any wiring.

It is an object of this invention to provide a convenient and accessible means for running inter-unit wiring that is neat in appearance and in which wiring can be easily changed, removed or added.

Figure 1:
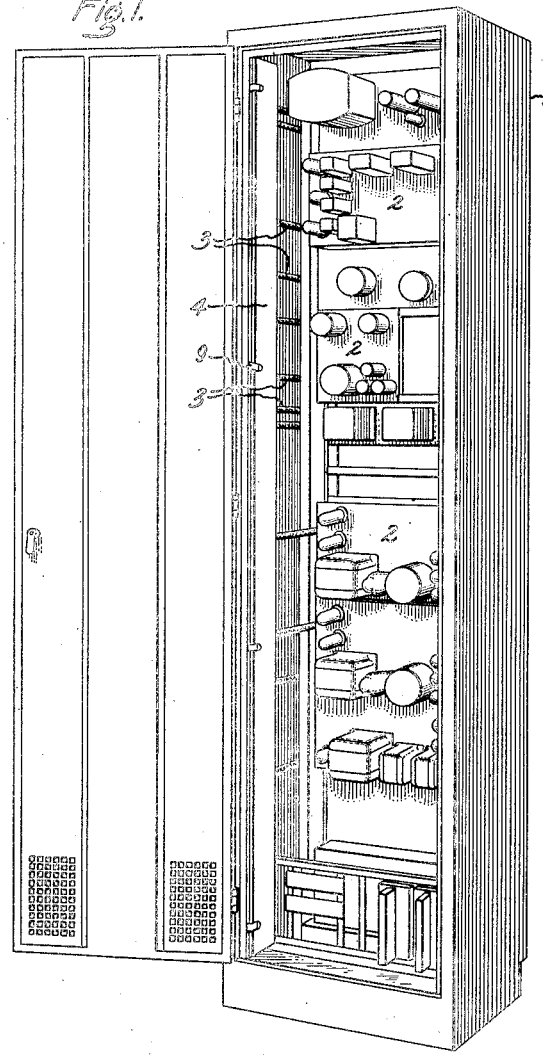
Figure 2:
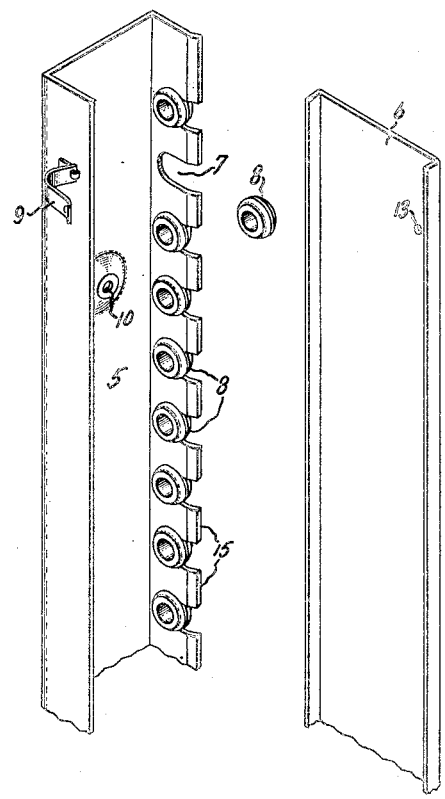
Figure 3:
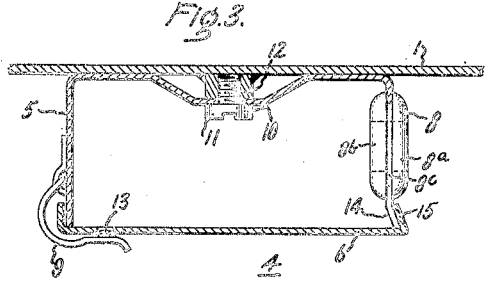

The features of this invention which I believe to be novel are set forth with particularity in the appended claims. My invention itself, however, together with further objects and advantages thereof, may best be understood by reference to the following description taken in conjunction with the accompanying drawing in which Fig. 1 is an electrical apparatus cabinet of the rack type housing conventional amplifiers and associated equipment and having a wiring duct of which Fig. 2 is an exploded view and Fig. 3 is a cross-section view of the wiring duct structure which illustrates one embodiment of my invention. Like parts are given the same reference numerals in the various figures.

Referring particularly to Fig. 1 of the drawing, I have shown an electrical apparatus cabinet of the conventional rack type including a plurality of amplifiers and associated equipment 2 of conventional type adapted for mounting in cabinets of this type, together with interconnecting wires 3, and a wiring duct 4.

Fig. 2 is an exploded view of the wiring duct 4 in which are shown the U-shaped channel 5, cover 6, slots 7, grommets 8, one of the catches 9 and mounting means 10. As is particularly evident from Fig. 3, the wiring duct consists essentially of a U-shaped channel member 5 equipped with a readily removable cover 6. In one side of said channel member 5 are a multiplicity of slots 7, each fitted with a bushing or grommet 8 of suitable insulating material, such as rubber. Each grommet comprises an outer annular ring 8a, an inner annular ring 8b and the center section 8c slightly smaller than the annular rings and slightly larger in diameter than the width of slots 7. The grommets are fitted into said slots by compression and are retained therein by frictionally engaging the side of the slots. The full length metal cover 6 is attached over the open side of the U-shaped channel member 5 by means of a flange 14 formed by bending the top edge of one side of said channel outward, engaging a lip 15, formed by bending one edge of said cover inward; and by spring clamps 9 attached to the opposite side of said channel member and engaging retaining sockets 13 in said cover. The wiring duct 4 is mounted in the cabinet 1 by means of screw 11 through mounting holes 10 into weld nuts 12, with slots 7 facing the front of said cabinet.

The problem of wiring between individual units 2 within the cabinet 1 is greatly simplified when this wiring duct 4 is employed. Wires 3 to the amplifiers and associated units mounted in the cabinet enter the duct through the insulating grommets which are fitted in the slots along the entire length of the duct. As the slots are spaced substantially uniform and at relatively small intervals apart along the entire length of the ducts, the length of wires 3 from the duct to the various units is kept to a minimum. It is not necessary to cable or lace together the wiring in the duct since, with the duct cover in place, the wiring is out of sight, protected and shielded electrically.

An outstanding feature is the ease with which inter-unit wiring may be removed or added without disturbing other wiring in the duct. With the cover off, inter-unit wiring may easily be removed by lifting the unwanted wires and attached grommets from the channel member; and additional wiring may be installed by slipping the wires through a rubber grommet into the channel member.

When there are both audio and power units mounted in the cabinets, two wiring duct structures may be mounted in the cabinet, one on either side. This will separate and shield the audio circuits from the power circuits.

While I have shown a particular embodiment of my invention, modifications thereof will occur to those skilled in the art. I desire it to be understood, therefore, that my invention is not to be limited to the particular arrangement and methods disclosed, and I intend in the appended claims to cover all modifications which do not depart from the spirit and scope of my invention.

What I claim as new and desire to secure by Letters Patent of the United States is:

1. In combination with a cabinet containing a plurality of apparatus units spaced in aligned relation therein, a conduit mounted on one inner wall of said cabinet and extending alongside all said units, said conduit comprising first and second interfitting channel members, said first member having a multiplicity of open slots closely spaced along the length of one side wall thereof adjacent said units, said slots terminating at the edge of said side wall, a flexible insulating grommet frictionally retained in each slot, said second member closing the open ends of said slots to define a wiring duct which is completely enclosed except for individual conductor apertures through said slots when said second member is interfitted with said first member, and a multiplicity of conductors interconnecting various ones of said units, each of said conductors being concealed within said conduit between apertures adjacent the units to which it is connected, said second member being readily removable to facilitate installation and removal of said conductors in said slots.

2. In an electrical apparatus cabinet of the rack type having a plurality of apparatus units spaced along the length thereof, a substantially U-shaped sheet metal channel member mounted on a wall of said cabinet and extending alongside all said units, said member having a multiplicity of closely spaced, open slots along the entire length of one side wall thereof adjacent said apparatus units, said slots terminating at the edge of said side wall, a flexible insulating grommet frictionally retained in each slot and a removable cover for said member forming a closed wiring duct structure therewith and closing the open ends of said slots when in position, said duct structure being completely enclosed except for said slots when said cover is in place but being readily detachable to facilitate making wiring connections between said cabinet racks.

MARVIN C. CISLER.

REFERENCES CITED

The following references are of record in the file of this patent:

UNITED STATES PATENTS

| Number | Name | Date |
|---|---|---|
| 1,848,837 | Powers | Mar. 8, 1932 |
| 2,191,637 | Wier | Feb. 27, 1940 |
| 2,324,791 | McLoughlin et al. | July 20, 1943 |